2,926,986
SOLUTIONS OF DIAZOAMINO DERIVATIVES AND A PROCESS FOR THEIR PREPARATION

Pierre Petitcolas, Rouen, and André Paul Richard, Les Authieux sur le Port St.-Ouen, Oissel, France, assignors to Compagnie Française des Matieres Colorantes, Paris, France, a corporation of France No Drawing. Application March 12, 1958
Serial No. 720,820

Claims priority, application France July 23, 1957

2 Claims. (Cl. 8—45)

Solutions comprising diazoamino compounds of aromatic amines free from solubilizing groups of the solid base type, and coupling components, such as the arylides of hydroxycarboxylic acids of the naphthalene series, of carbazole, of diphenylene oxide or of benzocarbazole, or the acylacylated derivatives of the benzene series or of diphenyl, have already been used in the fabric printing industry in order to form insoluble azo dyestuffs on cellulosic fibers. These solutions could be used directly by simple admixture with a suitable thickener. The advantage of such a method of introduction was to offer to the user products including all the ingredients necessary for the preparation of printing pastes. A simple weighing or measurement of volume gave immediately the quantities required to obtain a specific shade. This method of operation removed, in particular, the errors arising from the separate weighing of the dyestuff, the caustic soda or the solvent. The risks of skin affections or troubles of the respiratory tract, due to the powders of certain diazoamino compounds, were also removed. The preparation of such solutions and above all their storage or keeping was possible only because the hydrolysis of the compounds used and consequently the extent of coupling in the liquid was very small. Total hydrolysis and consequently a complete tinctorial yield was only obtained by utilizing, for the development of the colour, an organic acid vapour, generally of acetic acid and formic acid, or by passing the fabric through a bath of the said acids.

For the preparation of the insoluble azo dyestuffs on fibers, the tendency for some years has been towards the technique known as neutral development; the use of special stabilizing amines in fact allows a sufficient hydrolysis of the diazoamino compound in dilute alkaline medium to be obtained in steam at 100° to 102° C. and, consequently, the practically quantitative formation of the insoluble azo dyestuffs. The ease of this hydrolysis seemed to prohibit the use of such compounds for the preparation of solutions ready for use; it seem to be thought that after keeping for a certain time considerable amounts of azo dyestuffs would be formed.

But, contrary to all expectation, we have found that it is possible with a small number of diazoamino compounds to obtain, by a judicious choice of the stabilizing amines and by the use of suitable adjuvants, solutions which can be used in neutral development, which are extremely stable to storage at ordinary temperature, and what is more, are capable of standing a temperature of 50° to 55° C. for several months.

The solutions according to the invention comprise essentially, (a) A diazoamino compound of the general formula:

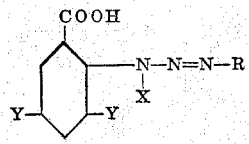

in which R represents the residue of a benzenic amine substituted by a member selected from the group consisting of the halogen atoms, and the alkyl, alkoxy and dialkyl sulphonamido groups, X represents a member selected from the group consisting of the $-CH_2COOH$, $-CH_2CH_2COOH$ and $-CH_2CH_2OH$ groups, and Y represents a member selected from the group consisting of the hydrogen and halogen atoms, this compound being in the form of its salt with an alkaline metal, (b) A coupling component selected from the group consisting of the arylides of 2:3-hydroxy-naphthoic acid, 2-hydroxy-3-carboxy carbazole and acetyl acetic acid.

(c) A solvent miscible in water and having a molecular weight between 62 and 162 inclusive, selected from the group consisting of thiodiglycol, glycols and ethers of glycols, and if desired (d) A volatile amine selected from the group consisting of diethylamino ethanol, diethanolamine, triethanolamine and piperidine.

As benzenic amines there may be mentioned, for example, p-toluidine, 1-amino-2-methyl-5-chlorobenzene, 1-amino-2-methyl-4-chlorobenzene, 1-amino - 2 - methyl-4:5-dichloro benzene, 1-amino-2-methoxy - 5 - chlorobenzene, 1-amino-2-methyl - 5 - dimethylsulphonamido-benzene, 1-amino-2-methoxy - 5 - diethylsulphonamido - benzene and 1-amino-2-methoxy-5-nitrobenzene.

Solvents which may be used in the process of the invention are, for example, ethylene glycol, diethylene glycol, propylene glycol, thiodiglycol, monoethyl, monomethyl, or monobutyl ethers of ethylene glycol or of diethylene glycol or dioxane.

The solutions of the invention must be prepared in as concentrated a state as possible so that the content of free caustic alkali is sufficient to ensure a correct keeping power. It must not be too high, however, as an excess of alkali would considerably reduce the tinctorial yield. It is in fact known that this yield is a function of the amount of free alkai in the printing paste. The alkalinity can still be increased and the possibilities of keeping also increased by incorporating small quantities of a volatile amine of medium molecular weight, namely, diethylaminoethanol, di- or tri-ethanolamines or piperidine. The presence of these amines does not hinder the development of the colour at all, since they are entrained during the steaming operation. In short, by using a minimum of water and a solvent which is miscible therewith, preferably an alcohol of medium molecular weight, the risks of hydrolysis of the diazoamino compound are again reduced in proportions such that the solutions thus obtained can be kept without perceptible alteration for a year and more.

The compounds of general Formula I not only possess the advantage of hydrolyzing very slightly in the cold in an alkaline medium, but also a property which is especially valuable, namely that of being very soluble. Hydrolysis and consequently maximum coupling only occur in the hot. The development can be effected in neutral steam; very rapid passage in acid steam can however also be used. In order to isolate these diazoamino compounds, it is essential either to salt them out by large quantities of caustic alkali and alkali metal chloride, or to subject the solution to an atomizing process. These processes give a crystalline product including large proportions of chloride and especially of alkali metal carbonate; the presence of the latter is explained by the fact that it is employed for the condensation of the diazo compound with the stabilizing amine. This carbonate considerably reduces the tinctorial yield, for the same reason as an excess of free caustic soda. It is preferable to separate it in the same way as the alkali metal chloride. The solutions according to the invention are therefore advantageously prepared in the following way:

The paste or powder obtained during the preparation of the diazoamino compound is mixed with the coupling component in the minimum amount of water to which has been added solvent, caustic alkali and possibly a volatile amine. After agitation the mixture is allowed to settle; two layers are formed—a lower aqueous layer including the greater part of the alkali metal carbonate and chloride, and an upper solvent layer including the greater part of the caustic alkali, the diazoamino compound, the coupling component and the volatile amine if present. The upper layer can be directly used for the preparation of printing pastes. It is also possible to proceed by centrifuging. With the solutions of diazoamino compounds thus obtained, it has been found that, from equal quantities of active products, a tinctorial yield is obtained which is distinctly superior to that obtained from diazoamino compounds isolated by salting out and drying or by atomizing. The increase in yield is particularly large in printing on fabrics based on regenerated cellulose.

The invention will be more clearly understood by reference to the following examples, in which the parts are parts by weight, and which are purely illustrative:

*Example 1*

240 parts by weight of a powder titrating about 77% of diazoamino compound, prepared by diazotization of 1-amino-2-methyl-5-chlorobenzene and condensation with 4:6-dichloro-2-carboxy-phenylglycine, and corresponding to the formula:

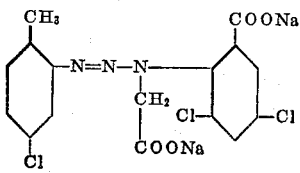

(mol. wt. 460.5), 10% sodium chloride, 3% of free caustic soda and 7% of sodium carbonate, are mixed with 124 parts of the o-phenetidide of the acid 2-hydroxy-3-carboxy-naphthalene. The mixture is introduced with agitation into a solution prepared from 80 parts by weight of a 35° Bé. caustic soda solution, 50 parts of diethylaminoethanol, 300 parts by volume of the monoethyl ether of ethylene glycol and 180 parts of water. After some hours' agitation and when everything has completely entered into solution, the mixture is allowed to settle or is passed into a centrifuge. The densest portion comprises 80 parts and contains practically only common salt, sodium carbonate and a small quantity of free caustic soda, excluding the diazoamino compound and the arylide. The upper layer, quite ready for use, includes 57 parts of 1-amino-2-methyl-5-chlorobenzene as the diazoamino compound and 124 parts of the o-phenetidide of the acid 2-hydroxy-3-carboxy-naphthalene. 150 parts by weight of this solution are made into a paste with 700 parts of 6% starch-tragacanth thickener, suitably neutralized with caustic soda, and 150 parts of water. Cotton fabric is printed, dried and steamed for 3 to 4 minutes in neutral steam or 10 to 20 seconds in acetic acid formic acid vapour. After washing with soap at the boil in a bath containing 2 grms. of Marseilles soap and 2 grms. of sodium carbonate per litre, rinsing and drying, a bright scarlet shade endowed with excellent fastness is obtained. The same tinctorial result is reached by using a solution prepared with the same substances but without diethylaminoethanol.

*Example 2*

35 parts of 1-amino-2-methyl-5-chlorobenzene are made into a paste with 70 parts of 20° Bé. hydrochloric acid and 70 parts of water. 180 parts of ice are then added and diazotization is effected at a temperature between 0° and 3° C. by the addition of 19 parts of sodium nitrite. After one hour of agitation the mixture is filtered and the solution of diazo derivative introduced into a solution comprising 75 parts of the acid N-(2-carboxy-4:6-dichlorophenyl) glycine, 500 parts of water and 55 parts of anhydrous sodium carbonate. The absorption is very rapid. When the diazo compound has completely reacted alkalination is effected by the addition of 80 parts of 35° Bé. caustic soda solution. The temperature rises to 20° C. The insoluble components are filtered and 1,000 parts by volume of filtrate are collected. 200 parts of 96% caustic soda are added to this filtrate. The temperature rises to 70° C. After one hour of stirring the precipitate is filtered and dried. A paste having a diazoamino compound base of the same formula as in Example 1 is obtained, titrating 12.3% of amine of molecular weight 141.5, 5% of sodium chloride, 3% of sodium carbonate and 8% of caustic soda. 452 parts of this paste are introduced with stirring, at the same time as 124 parts of the o-toluidide of the acid 2-hydroxy-3-carboxy-naphthalene, into 270 parts of the monoethyl ether of ethylene glycol, 40 parts of diethylaminoethanol and 100 parts of water. After agitating for an hour, the crystals of sodium carbonate which have precipitated are drained and the solution obtained is subjected to decantation. The lower layer, practically saturated with sodium carbonate, contains 6 parts of caustic soda; the diazoamino compound and the arylide are found entirely in the solvent layer. The upper layer is the solution ready for use and represents 900 parts. 150 parts of this solution are made into a paste in 700 parts of 6% starch-tragacanth thickener and 150 parts of water, and printing, development and finishing are effected as in the preceding example. An intense vivid red is obtained. After stirring the solution for two months at a temperature of 50° C., there is practically no fall in yield which can be obtained. The same tinctorial yield is obtained with a solution prepared from the same substances but without diethylaminoethanol.

*Example 3*

850 parts of the paste used in Example 2 are dissolved, at the same time as 170 parts of diacetoacetyltolidine, in a mixture prepared from 600 parts of the monoethyl ether of ethylene glycol, 170 parts of diethylaminoethanol and 180 parts of tepid water. After dissolving, the solution is allowed to settle; the lower layer, representing 100 parts, is saturated with salt and sodium carbonate and only contains 6 parts of caustic soda. The upper solution is decanted and is ready for use; it represents 1,800 parts by weight. 150 parts of this are made into a paste with 700 parts of neutralized starch-tragacanth thickener and 150 parts of water, and printing, steaming in neutral steam and the usual finishing treatments are carried out. A very fast bright yellow is obtained. Development in acid steam is very rapid and in 10 or 20 seconds the maximum tinctorial yield is obtained. With a solution prepared from the same substances but without diethylaminoethanol, the tinctorial yield is the same.

*Example 4*

130 parts of a powder titrating 70% of diazoamino compound of the formula:

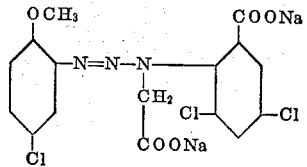

(mol. wt. 476.5), 10% of sodium carbonate, 2% of caustic soda and 8% of sodium chloride, are mixed with 60 parts of the m-nitranilide of the acid 2-hydroxy-3-carboxy-naphthalene. This mixture is gradually introduced into a solution prepared from 270 parts by weight of the monoethyl ether of ethylene glycol, 80 parts of diethylaminoethanol, 200 parts of water and 5 parts by weight of a 35° Bé. solution of caustic soda. The solution is completed with 160 parts of water. It is left to settle and the upper layer is separated. The printing, development and finishing are carried out as in the preceding examples. A Bordeaux shade having good fastness is obtained. The tinctorial yield is the same in the absence of diethylaminoethanol.

*Example 5*

One uses 200 parts by weight of the paste isolated by filtration from the solution from the preparation of the diazoamino compound of Example 4, and titrating 42% of diazoamino compound of mol. wt. 476.5, 3% of sodium carbonate, 8% of sodium chloride and 3% of caustic soda. This paste is introduced with agitation, at the same time as 54 parts of the p-chloranilide of the acid 2-hydroxy-3-carboxy-carbazole, into a solution prepared from 60 parts of 35° Bé. caustic soda solution, 200 parts of water, 80 parts of diethylaminoethanol, 250 parts of the monoethyl ether of ethylene glycol and 60 parts of a 15% by weight solution of sodium chromate. The solution is completed by adding about 150 parts of water. It is allowed to settle and the upper layer is separated. The solution obtained is very stable on keeping and stands a temperature of 50° to 55° C. for several months without perceptible change. On using it for printing on cotton as has been described in the preceding examples, a brown shade endowed with excellent fastness is obtained. If one works in the absence of diethylaminoethanol the tinctorial yield is the same.

*Example 6*

A mixture is prepared from 204 parts of the product resulting from the condensation of the diazo derivative of 1-amino-2-methoxy-5-diethylsulphonamido-benzene with 1-carboxy-2-hydroxyethylamino-5-bromobenzene, and titrating 82% of the diazoamino compound corresponding to the formula:

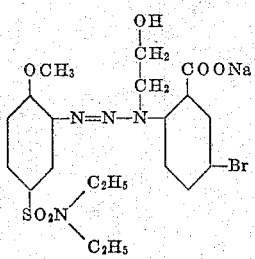

(mol. wt. 551), 3% of sodium chloride and 8% of sodium carbonate, with 120 parts of the 3'-chloro-4':6'-dimethoxy-anilide of the acid 2-hydroxy-3-carboxy-naphthalene. This mixture is dissolved with agitation in 270 parts by weight of the monoethyl ether of ethylene glycol, 100 parts of 35° Bé. caustic soda solution, 80 parts of diethylaminoethanol and 160 parts of hot water. The solution is left to stand for some hours. The lower layer which has settled is drawn off. It represents 70 parts and comprises only sodium carbonate and about 4 parts of caustic soda, with exclusion of all the coupling components which remain wholly in the upper solvent layer. 30 parts of this solution are made into a paste in 700 parts of 6% starch-tragacanth thickener and 300 parts of water. Cotton fabric is printed therewith, dried and steamed at 100° to 102° C. in neutral steam for 3 to 4 minutes. The fabric is subjected to the usual finishing treatments. A bluish rose shade having excellent fastness is obtained. The tinctorial yield is the same if the diethylaminoethanol is not employed.

*Example 7*

On diazotizing 1-amino-2-methyl-4:5-dichlorobenzene under the usual conditions and condensing it in an alkaline medium with 1-carboxy-4:6-dichlorophenylglycine, the diazoamino compound of the formula:

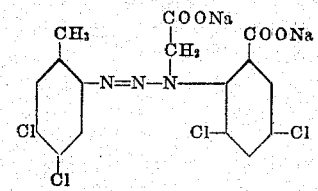

is obtained. 115 parts of the condensation product, titrating 80% of the diazoamino compound of mol. wt. 495, 6% of sodium carbonate and 4% of sodium chloride are introduced at the same time as 60 parts of the o-phenetidide of the acid 2-hydroxy-3-carboxy-naphthaline into a mixture of 150 parts of the monoethyl ether of ethylene glycol, 40 parts of diethylaminoethanol, 35 parts of 35° Bé. caustic soda solution. Solution is completed by agitation and addition of 100 parts of water. The mixture is left to settle and the upper layer is isolated. A printing paste comprising 150 parts of this solution to 1,000 parts of paste is prepared by the process of the preceding examples. Printing gives a vivid scarlet shade having excellent fastness. The same tinctorial result is obtained in the absence of diethylaminoethanol.

*Example 8*

The diazoamino compound corresponding to the formula:

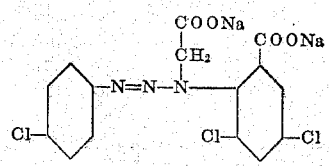

is prepared by known processes. 90 parts of the condensation product, titrating 75% of a compound of mol. wt. 426, 6% of sodium carbonate, 6% of sodium chloride and 1% of sodium hydroxide and 60 parts of the p-chloranilide of the acid 2-hydroxy-3-carboxy-carbazole are dissolved in a mixture comprising 160 parts of diethylene glycol, 80 parts of 35° Bé. caustic soda solution, 6 parts of sodium dichromate and 50 parts of water. The solution is allowed to settle and the upper layer is separated. A solution is obtained which, by the technique of development in neutral or acid steam, allows very beautiful red-brown shades to be obtained on fabrics of cotton or rayon yarn.

*Example 9*

210 parts of the product resulting from the preparation of the diazoamino compound corresponding to the formula:

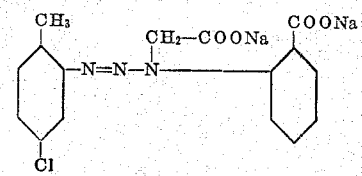

and titrating 75% of diazoamino compound (mol. wt. 391.5), 10% of sodium carbonate, 5% of sodium chloride and 3% of free caustic soda, are mixed with 124 parts of the o-phenetidide of the acid 2-hydroxy-3-carboxy-naphthalene. This mixture is added in small portions with agitation to 300 parts of the monoethyl ether of ethylene glycol, 40 parts of diethylaminoethanol, 210 parts of 35° Bé. caustic soda solution and 50 parts of water. The solution is left to settle and the upper layer is collected. The solution obtained, ready for use for the printing, allows beautiful very fast scarlet shades to be obtained by the known steaming processes. The tinctorial yield is the same if diethylaminoethanol is omitted.

We claim:
1. Process for the preparation of stable liquid compositions directly usable for printing, containing a diazoamino compound and a coupling component which comprises adding to a mixture containing essentially
(a) A diazoamino compound of general formula:

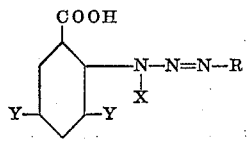

in which R represents the residue of a benzenic amine substituted by a member selected from the group consisting of the halogen atoms and the alkyl, alkoxy and dialkylsulphonamido groups, X represents a member selected from the group consisting of the —CH₂COOH, —CH₂CH₂COOH and —CH₂CH₂OH groups, and Y represents a member selected from the group consisting of the hydrogen and halogen atoms,
(b) A coupling component selected from the group consisting of the arylides of 2:3-hydroxynaphthoic acid, 2-hydroxy-3-carboxy carbazole and acetylacetic acid,
(c) Water,
(d) A caustic alkali,
(e) Mineral salts,
A solvent miscible in water and having a molecular weight between 62 and 162 inclusive, selected from the group consisting of thiodiglycol, glycols and ethers of glycols, decanting and separating the lighter layer, which contains the diazoamino compounds and the coupling component, from the denser layer which contains the mineral salts.

2. Stable liquid compositions directly usable for printing comprising essentially (a) A diazoamino compound of general formula:

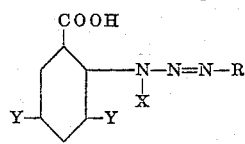

in which R represents the residue of a benzenic amine substituted by a member selected from the group consisting of the halogen atoms and the alkyl, alkoxy and dialkylsulphonamido groups, X represents a member selected from the group consisting of the —CH₂COOH, —CH₂CH₂COOH and —CH₂CH₂OH groups and Y represents a member selected from the group consisting of the hydrogen and halogen atoms, this compound being in the form of an alkali metal salt,
(b) A coupling component selected from the group consisting of the arylides of 2:3 hydroxynaphthoic acid, 2-hydroxy-3-carboxy carbazole and acetyl acetic acid,
(c) A solvent, miscible in water, having a molecular weight between 62 and 162 inclusive, selected from the group consisting of thiodiglycol, glycols and ethers of glycols, said composition made in accordance with the method defined in claim 1.

References Cited in the file of this patent
UNITED STATES PATENTS

| | | |
|---|---|---|
| 2,648,660 | Lantz | Aug. 11, 1953 |
| 2,758,001 | Glietenberg | Aug. 7, 1956 |
| 2,781,337 | Moser | Feb. 12, 1957 |
| 2,781,338 | Moser | Feb. 12, 1957 |
| 2,795,575 | Sureau | June 11, 1957 |
| 2,815,259 | Glietenberg | Dec. 3, 1957 |
| 2,822,234 | Glietenberg | Feb. 4, 1958 |

FOREIGN PATENTS

| | | |
|---|---|---|
| 108,429 | Sweden | Sept. 14, 1943 |

The formula shown is:

$$\text{COOH on benzene ring with } Y\text{—}\underset{}{\bigcirc}\text{—}Y \text{ and substituent } -N-N=N-R \text{ with } X \text{ on the first } N$$